United States Patent
Gillman et al.

(10) Patent No.: US 6,817,439 B2
(45) Date of Patent: Nov. 16, 2004

(54) METHOD FOR CONTROLLING AN ELECTRIC POWER ASSIST STEERING SYSTEM WITH LOW HYSTERESIS AND TORQUE RIPPLE

(75) Inventors: Stephen V. Gillman, Grand Blanc, MI (US); Chris E. McHugh, Grand Blanc, MI (US); Scott A. Millsap, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/369,071

(22) Filed: Feb. 19, 2003

(65) Prior Publication Data

US 2003/0132054 A1 Jul. 17, 2003

Related U.S. Application Data

(63) Continuation-in-part of application No. 09/825,794, filed on Apr. 4, 2001, now Pat. No. 6,655,493.

(51) Int. Cl.[7] .............................. B62D 3/04; B62D 5/04; B62D 6/10
(52) U.S. Cl. .............. 180/443; 73/862.333; 324/207.21
(58) Field of Search ..................... 73/862.333–862.336; 180/443, 446; 324/207.13, 207.21, 209

(56) References Cited

U.S. PATENT DOCUMENTS

| | | | | |
|---|---|---|---|---|
| 5,465,210 A | * | 11/1995 | Walenty | 701/1 |
| 5,743,351 A | * | 4/1998 | McLaughlin | 180/446 |
| 5,919,241 A | * | 7/1999 | Bolourchi et al. | 701/41 |
| 6,008,599 A | * | 12/1999 | Beck | 318/254 |
| 6,039,144 A | * | 3/2000 | Chandy et al. | 180/446 |
| 6,050,360 A | * | 4/2000 | Pattok et al. | 180/446 |
| 6,122,579 A | * | 9/2000 | Collier-Hallman et al. | 701/41 |
| 6,145,387 A | * | 11/2000 | Garshelis | 73/862.336 |
| 6,250,421 B1 | * | 6/2001 | Poshadlo | 180/446 |
| 6,655,493 B2 | * | 12/2003 | Menjak et al. | 180/443 |
| 2001/0028087 A1 | * | 10/2001 | Hirashita et al. | 257/344 |
| 2001/0032752 A1 | * | 10/2001 | Fujita et al. | 180/443 |
| 2002/0148674 A1 | * | 10/2002 | Menjak et al. | 180/446 |

* cited by examiner

Primary Examiner—Lesley D. Morris
Assistant Examiner—Matthew Luby
(74) Attorney, Agent, or Firm—Michael D. Smith

(57) ABSTRACT

An electric power assist steering system is controlled by sensing torque in a steering shaft at a point along said steering shaft between a hand wheel and a mechanical connection to an electric motor, wherein the sensing includes sensing a magnetic field direction and intensity.

16 Claims, 3 Drawing Sheets

CIRCUMFERENTIALLY
POLARIZED REGIONS

METHOD FOR CONTROLLING AN ELECTRIC POWER ASSIST STEERING SYSTEM WITH LOW HYSTERESIS AND TORQUE RIPPLE

CROSS REFERENCE TO RELATED APPLICATIONS

This application is a continuation-in-part and claims benefit of U.S. patent application Ser. No. 09/825,794 filed Apr. 4, 2001, now U.S. Pat. No. 6,655,493.

BACKGROUND

In a typical electric power steering (EPS) system, a hand wheel is connected to a shaft, which comprises an upper shaft and a lower shaft connected by a torsion bar. The upper shaft connects to the hand wheel and the lower shaft connects to an intermediate shaft that ultimately connects to the rack and pinion gear of a vehicle. When the hand wheel is turned, the upper shaft rotates and a torque sensor measures the angular displacement of the torsion bar. The torque sensor is typically located at the interface between the upper and the lower shaft, which is also the location of the torsion bar. The type of torque sensor typically used has been a contacting type, which requires use of a torsion bar to measure the amount of twist on the torsion bar. The torque sensor sends a signal to the controller, which then sends a signal to the motor to begin operating. The motor powers a gear mechanism, which provides assistance in turning the lower shaft and ultimately the road wheels.

A drawback of such torque sensors that rely on the relative rotational displacement of an upper and lower shaft is that they generate hysteresis, which is a lagging effect, and torque ripple, both effects being detrimental to the feel of the power assist steering system. Hysteresis is generated, e.g., from the sensor, the torsion bar itself, bearings on the upper and lower shafts, and any misalignment of the shafts. The amount of hysteresis of the sensor, torsion bar, and bearings can be 0.5 Nm or larger. Hysteresis in these elements generate a torque ripple effect which can be felt at the handwheel as an uneven resistance or periodic pulling effect.

SUMMARY

Disclosed is a method for controlling an electric power assist steering system with low hysteresis and torque ripple by sensing torque in a steering shaft at a point along said steering shaft between a hand wheel and a mechanical connection to an electric motor, wherein the sensing includes sensing a magnetic field direction and intensity.

BRIEF DESCRIPTION OF THE DRAWINGS

Referring now to the drawings wherein like elements are numbered alike in the several Figures.

DETAILED DESCRIPTION

Figure 1:
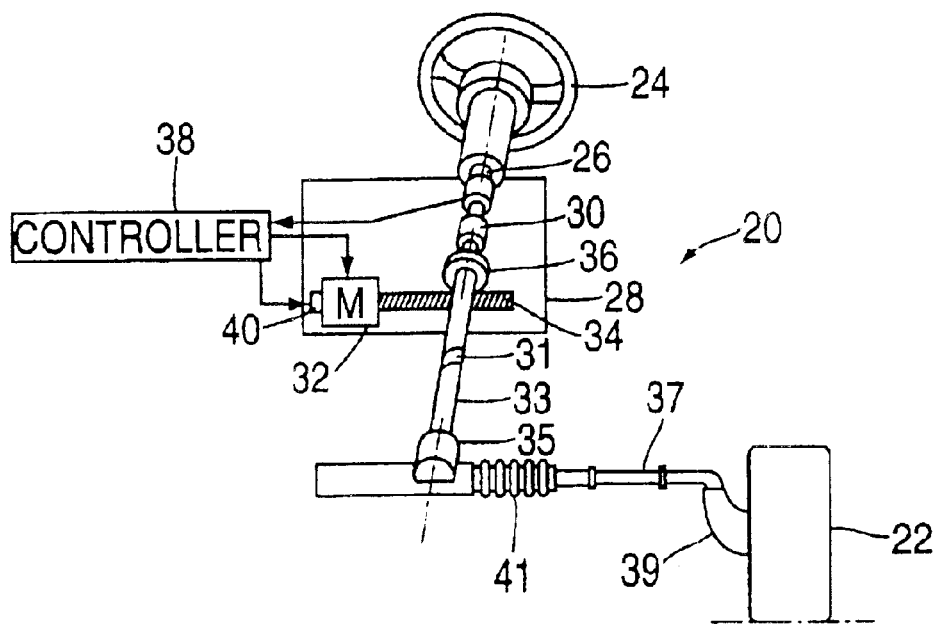
FIG. 1 is a schematic perspective view of a steering system of a vehicle.

Referring to FIG. 1, the steering system 20 comprises an EPS system, which is connected at a hand wheel 24 through a shaft 26 and a housing 28. The EPS system provides a driver with assistance in turning a vehicle's road wheels 22. The driver turns the hand wheel 24, which is mechanically connected to a shaft 26. The rotational force of the hand wheel 24 is transmitted to the shaft 26, which is detected by a non-compliant torque sensor 30. The non-compliant torque sensor 30 is located at the shaft 26 from about a midpoint 29 at the shaft 26 to an upper end 27 of the shaft 26. The non-compliant torque sensor 30 measures the torque applied to the shaft 26 and sends a signal to a controller 38, which may be a column electronics module. The controller 38 then sends a signal to the motor 32 to begin operation. The motor 32, which is in mechanical communication with a worm 34 and a worm gear 36, rotates the worm 34 and the worm gear 36, which provide turning assistance to the shaft 26. As the shaft 26 turns, an intermediate shaft 33, connected through a universal joint 31 rotates a pinion gear (not shown) located under a gear housing 35. Rotation of the pinion gear (not shown) moves a rack 41, which moves a tie rod 37. When the tie rod 37 moves, it turns a steering knuckle 39, which turns a road wheel 22.

Figure 2:
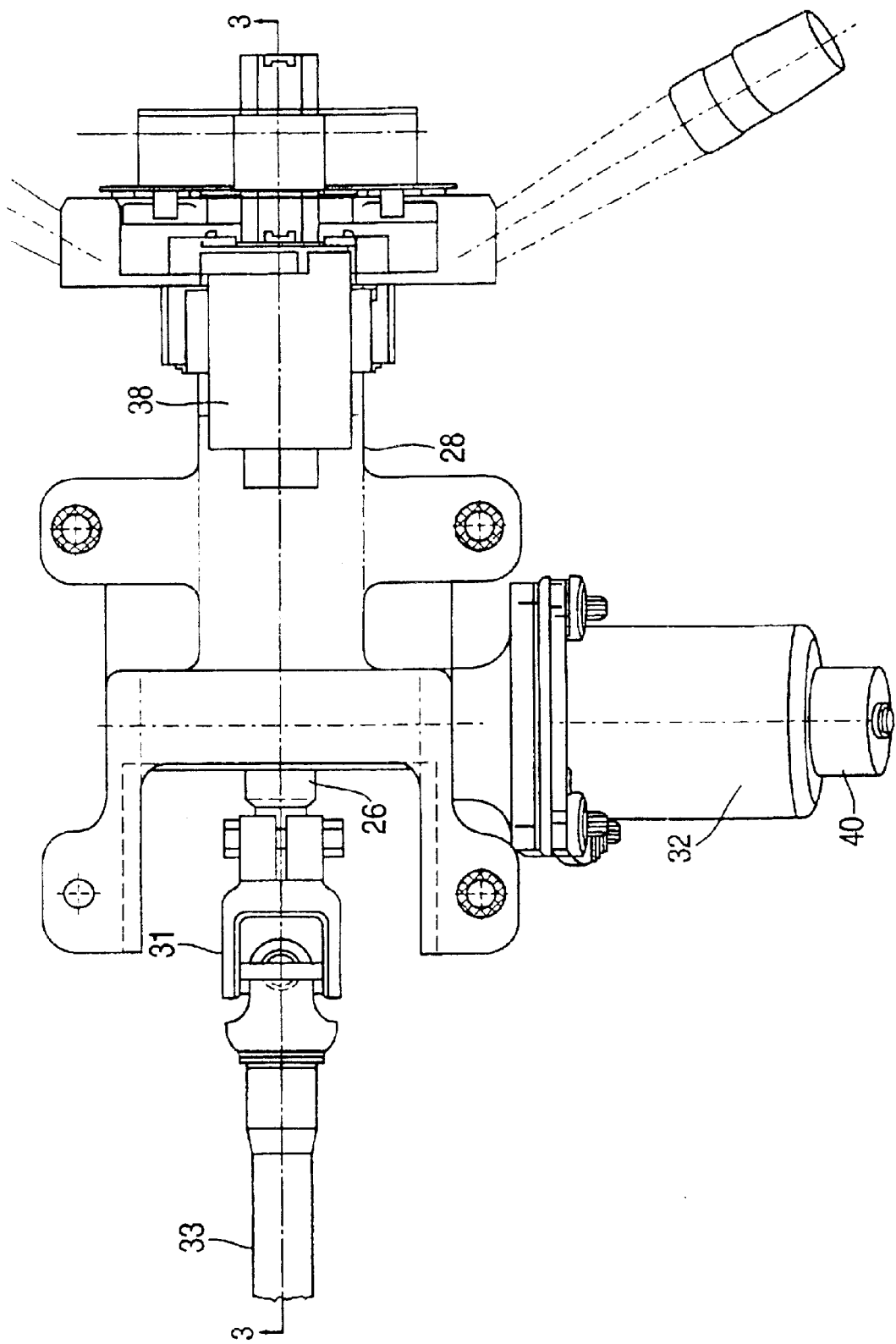
FIG. 2 is a top view of an EPS system with a motor.
Figure 3:
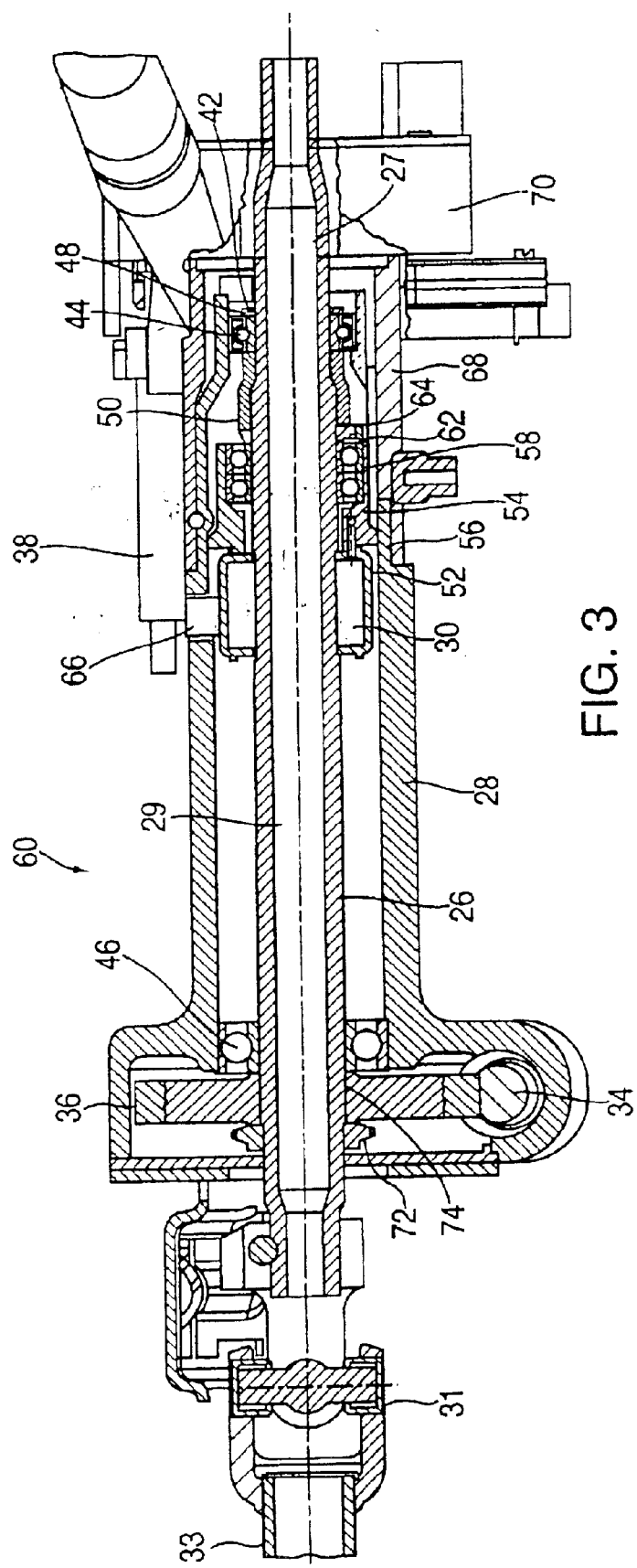
FIG. 3 is a cross-section view of an EPS system with a single shaft and single housing unit.

Referring to FIGS. 2 and 3, the EPS system and shaft 26 are mounted to a vehicle by a housing 28, which may be a single cast unit. The EPS system, shaft 26, and housing 28 collectively may be referred to as the steering column 60. Referring to FIG. 3, an upper bearing 44 and a bearing 46 support the shaft 26. The upper bearing 44 is secured to the shaft 26 by a retaining ring 42. A bearing lash eliminator 48 is pressed between the upper bearing 44 and the retaining ring 42.

A position sensor 70, which detects the angular position or displacement of hand wheel 24 (not shown in FIG. 3), is connected to a bracket switch mounting 68, which is in operable communication with the controller 38. The bracket switch mounting 68 is mounted to the face of the housing 28. Both the position sensor 70 and the bracket switch mounting 68 are located adjacent to the hand wheel.

As stated above, the non-compliant torque sensor 30 is located anywhere from about a midpoint 29 at the shaft 26 to an upper end 27 of the shaft 26. A spacer 50 may be used to locate the non-compliant torque sensor 30 on the shaft 26 in proximity to the end of the controller 38. The non-compliant torque sensor 30 comprises a magnetometer housing 52, which is secured to a bearing housing 54 by a fastener 56. The bearing housing 54 contains a bearing 58 and a bushing 64, which supports the magnetometer housing 52 and secures it to the shaft 26. A snap ring 62 secures the bearing housing 54 to the shaft 26. Preferably, there is a connection pathway 66 in the housing 28 to directly connect the non-compliant torque sensor 30 to the controller 38, which is located on the face of the housing 28 adjacent to the hand wheel (not shown).

Figure 4:
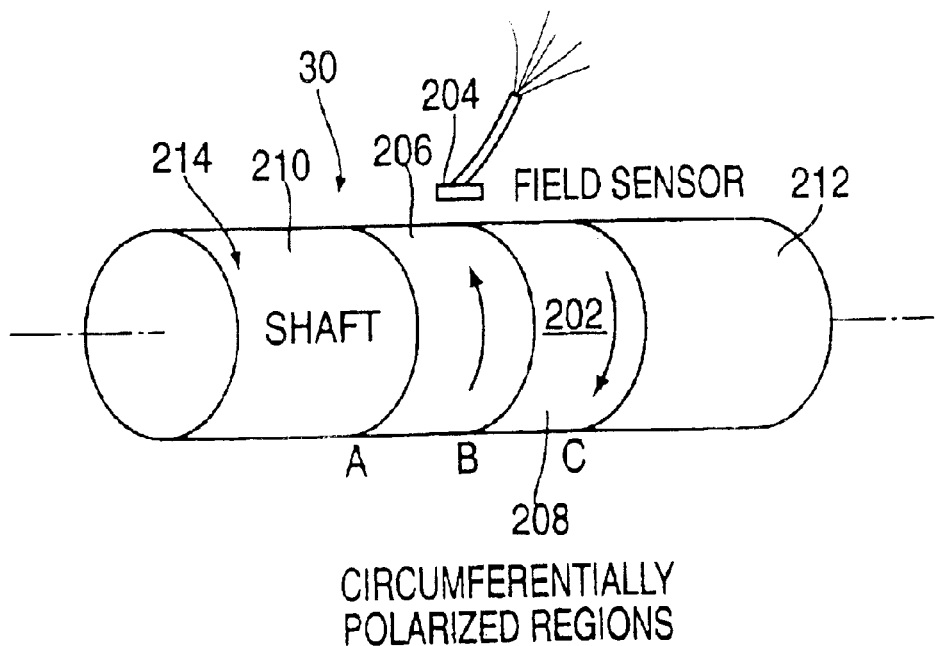
FIG. 4 is a schematic perspective view of a prior art non-compliant torque sensor.

Referring to FIG. 4, the non-compliant torque sensor 30 comprises a transducer 202 and a magnetic field vector sensor 204. The transducer 202 comprises one or more axially distinct, magnetically contiguous, oppositely polarized circumferential bands or regions 206, 208 solely defining the active or transducer region of the shaft. Region 210 of the shaft to the left of A and region 212 to the right of B are distinguishable from the active region only by the absence of any significant remanent magnetization. The shaft is typically formed of a ferromagnetic, magnetostrictive material having a particularly desirable crystalline structure. When the shaft of the non-compliant torque sensor 30 is the shaft 26 of the FIGS. 1–3. torque 214 is applied at one portion of the shaft 26 and is transmitted thereby to another portion of the shaft 26 where the motion of the shaft 26 due to torque 214 ultimately turns the road wheels (not shown) of the vehicle. Torque 214 is being shown as being in a clockwise direction looking at the visible end of the shaft 26, but obviously can be applied to rotate in either direction depending on the direction the driver turns the hand wheel (not shown).

A magnetic field vector sensor 204 is a magnetic field vector sensing device located and oriented relative to the transducer 202 so as to sense the magnitude and polarity of the field arising in the space about the transducer 202 as a result of the reorientation of the polarized magnetization from the quiescent circumferential direction to a more or less steep helical direction. The magnetic field vector sensor 204 provides a signal output reflecting the magnitude of torque 214 and electrically connected to the controller (not shown). The non-compliant torque sensor 30 is more fully described in U.S. Pat. No. 6,145,387, which is incorporated in its entirety herein by reference.

Referring to FIGS. 2 and 3, when the controller 38 receives a signal from the non-compliant torque sensor 30 indicating steering effort by a driver against the hand wheel, the controller 38 then sends a signal to the motor 32 to turn on. When the motor 32 turns on it turns the shaft 26 through a worm 34 and worm gear 36 assembly. The worm 34 is rigidly connected to a motor 32 and engages worm gear 36. Worm gear 36 is mounted to the shaft 26 on splines (not shown). A spring 74 is mounted between the splines (not shown). A nut 72 supports the worm gear 36 in place along the shaft 26. A bearing 46 supports the worm gear 36 at the shaft 26.

Referring to FIG. 2, a magnetorheological fluid stopper 40 is mounted on the motor 32. The magnetorheological fluid stopper 40 is fully described in U.S. application Ser. No. 09/825,793, filed Apr. 4, 2001, entitled, "Magnetorheological Fluid Stopper At Electric Motor" under Attorney docket number DE3-/DP-303759, which is incorporated in its entirety herein by reference.

Hysteresis and torque ripple are virtually eliminated by sensing torque in shaft 26 without the use of a torsion bar and improving torque sensor accuracy and steering accuracy. The elimination of the torsion bar makes unnecessary additional supporting needle bearings, previously required to maintain the alignment of shaft portions connected by the torsion bar, further reducing hysteresis.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. A method for controlling an electric power assist steering system comprising:
sensing torque in a steering shaft at a point along said steering shaft between a hand wheel and a mechanical connection to an electric motor, said sensing comprising sensing a magnetic field direction and intensity;
detecting said magnetic field using a magnetic field vector sensor disposed coaxially over said steering shaft;
maintaining said magnetic field vector sensor coaxially over said steering shaft by supporting said magnetic field vector sensor on said steering shaft using a bearing; and,
prohibiting said magnetic field vector sensor from rotating with said steering shaft by mechanically engaging said magnetic field vector sensor with a steering shaft housing.

2. The method of claim 1 wherein said sensing does not involve detecting a relative angular displacement between two shaft portions connected by a torsion bar.

3. The method of claim 1 further comprising supporting said steering shaft by a first bearing located near a steering wheel at a first end of said shaft and by a second bearing located near an opposite end of said shaft.

4. The method of claim 3 wherein said supporting comprises supporting said steering shaft only using said first bearing and said second bearing.

5. The method of claim 1 wherein said sensing includes sensing said magnetic field at a position along said steering shaft closer to said hand wheel than said electric motor.

6. The method of claim 1 wherein said bearing is a ball bearing.

7. A method of controlling an electric power assist steering system with reduced hysteresis and torque ripple, the method comprising:
sensing torque in a steering shaft at a point along said steering shaft between a hand wheel and a mechanical connection to an electric motor, said sensing comprising sensing a magnetic field direction and intensity without use of a torsion bar, thereby reducing said hysteresis and said torque ripple in said system;
detecting said magnetic field using a magnetic field vector sensor disposed coaxially over said steering shaft;
maintaining said magnetic field vector sensor coaxially over said steering shaft by supporting said magnetic field vector sensor on said steering shaft using a bearing; and,
prohibiting said magnetic field vector sensor from rotating with said steering shaft by mechanically engaging said magnetic field vector sensor with a steering shaft housing.

8. The method of claim 7 wherein said sensing does not involve detecting a relative angular displacement between two shaft portions connected by a torsion bar.

9. The method of claim 7 further comprising supporting said steering shaft only by a first bearing located near a steering wheel at a first end of said shaft and by a second bearing located near an opposite end of said shaft.

10. The method of claim 7 wherein said sensing includes sensing said magnetic field at a position along said steering shaft closer to said hand wheel than said electric motor.

11. A method for controlling an electric power assist steering system comprising:
sensing torque in a steering shaft at a point along said steering shaft between a hand wheel and a mechanical connection to a motor, said sensing comprising sensing a magnetic field direction and intensity with a non-compliant torque sensor;
providing a controller in operable communication with the motor;
mechanically engaging said sensor with a steering shaft housing;

connecting said sensor directly to said controller through a connection pathway in said steering shaft housing;

receiving a signal from the non-compliant torque sensor in the controller; and, sending a signal from the controller to the motor in response to the signal from the non-compliant torque sensor received in the controller.

12. The method of claim 11 wherein said sensing does not involve detecting a relative angular displacement between two shaft portions connected by a torsion bar.

13. The method of claim 11 further comprising mounting said controller on a face of said housing adjacent to said hand wheel.

14. The method of claim 11 further comprising mounting a magnetorheological fluid stopper on the motor.

15. The method of claim 11 wherein said torque sensor is a magnetic field vector sensor, the method further comprising disposing the magnetic field vector sensor coaxially over said steering shaft.

16. The method of claim 15 further comprising prohibiting said magnetic field vector sensor from rotating with said steering shaft by mechanically engaging said magnetic field vector sensor with the steering shaft housing.

* * * * *